United States Patent [19]

Grace

[11] Patent Number: 4,695,345

[45] Date of Patent: Sep. 22, 1987

[54] CONTINUOUS OR SEMI-CONTINUOUS PROCESS FOR FORMING RECONSOLIDATED WOOD PRODUCT

[75] Inventor: William G. Grace, Warragul, Australia

[73] Assignee: Repco Limited, Melbourne, Australia

[21] Appl. No.: 765,308

[22] PCT Filed: Nov. 23, 1984

[86] PCT No.: PCT/AU84/00242

§ 371 Date: Jul. 23, 1985

§ 102(e) Date: Jul. 23, 1985

[87] PCT Pub. No.: WO85/02368

PCT Pub. Date: Jun. 6, 1985

[30] Foreign Application Priority Data

Nov. 23, 1983 [AU] Australia ............................. PG2517

[51] Int. Cl.[4] ............................................. B32B 31/00

[52] U.S. Cl. ..................................... 156/264; 144/362

[58] Field of Search ...................... 156/228, 296, 62.8, 156/157, 266; 144/2 R, 360, 361, 362

[56] References Cited

U.S. PATENT DOCUMENTS 2,758,630 8/1956 Hodge ............................ 156/266 X
3,674,219 7/1972 Harvey .......................... 144/2 R X
4,232,067 11/1980 Coleman ........................ 144/361 X
4,343,667 8/1982 Hollis ................................ 156/157
4,390,384 6/1983 Turner ........................... 156/157 X
4,507,162 3/1985 Iwamoto ............................ 156/157
4,508,772 4/1985 Churchland et al. ........... 156/296 X

*Primary Examiner*—Robert L. Spruill
*Assistant Examiner*—Steven P. Weihrouch
*Attorney, Agent, or Firm*—Sughrue, Mion, Zinn, Macpeak & Seas

[57] ABSTRACT

Method and apparatus for forming a reconsolidated wood product from natural wood which has been rended to form flexible open lattice work webs (14) of naturally interconnected wood strands. The webs (14) are laid one over the other in overlapping fashion, treated with a bonding agent, and compressed in a compression apparatus (100) having two members (102, 104) which are cyclically moved towards each other, to effect compression of the webs, and then moved away from each other to permit further webs to be positioned for compression in the compression device. Movement of the webs through the apparatus is effected by engaging the bonded webs, after compression and when the members (102, 104) are moved away from each other, so as to draw following laid in webs (14) into the space between the members (102, 104).

7 Claims, 6 Drawing Figures

CONTINUOUS OR SEMI-CONTINUOUS PROCESS FOR FORMING RECONSOLIDATED WOOD PRODUCT

This invention relates to a process for forming a reconsolidated wood product, apparatus for forming a reconsolidated wood product, and a reconsolidated wood product formed by the process.

Australian Patent Specification No. 510,845 describes a reconsolidated wood product formed from at least one flexible open lattice work web of naturally interconnected wood strands generally aligned along a common grain direction, a substantial proportion of said strands being substantially discrete but incompletely separated from each other; said web having been consolidated by compression whilst substantially maintaining the wood strands aligned along same common grain direction and said strands being bonded together to hold them in juxtapositions assumed pursuant to said consolidation.

That patent specification also describes a process for forming a reconsolidated wood product from a flexible open lattice work web of naturally interconnected wood strands, said web being formed by partially rending natural wood so that said strands are generally aligned along a common grain direction, a substantial proportion of said strands being substantially discrete but incompletely separated from each other, said process comprising compressing the web to consolidate the strands whilst maintaining them such as to substantially extend in said original grain direction and bonding said splinters or strands together to hold them in juxtapositions assumed pursuant to said consolidation.

An object of this invention is to provide a process and apparatus capable of producing a continuous product, thereby to improve production efficiency and reduce losses occurring in finishing discrete product lengths.

In one aspect of the present invention, there is provided a process for forming a reconsolidated wood product as described above, said web comprising one of a plurality of webs; said process further comprising applying bonding agent to said webs, for effecting said bonding, and successively passing them through a compression device to effect said compression and consolidation, said webs being fed into the device in such a fashion that the webs make an angle to the direction of extent of the product and so that adjacent webs overlap each other in the direction of passing of the webs through said compression device.

The passing through of the webs may be effected by engagement and movement of the reconsolidated wood product emerging from the device.

The process of the invention may be carried out in a semi-continuous fashion, with the said compression device comprising two compression elements which are moved towards each other to effect said compression and consolidation, the engagement and movement of the reconsolidated product emerging from the device being effected by gripping the product with gripping means and moving the gripping means to effect the engagement and movement of the product.

The invention further provides, in another aspect, apparatus for carrying out the process of the invention, the apparatus comprising a compression device having a space extending therethrough for passage of said webs, after application of bonding agent, through the compression device, said compression device being effective to compress and consolidate said webs as they pass therethrough; and engagement means operable to engage the reconsolidated wood product as it emerges from said space, or said webs before passage into said space, to effect said passing through of the webs. Preferably, the compression device includes a pair of members movable towards and away from each other whereby to present, at two extreme positions of such movement respective greater and lesser magnitudes of said space therebetween and means for cyclically moving the elements between said extreme positions, said engagement means being effective to move said product intermittently and at times when the said members do not present said lesser magnitude of said space. Preferably, the members are arranged so that said space is convergent in the direction from an input to an output end thereof.

The invention is further described by way of example only with reference to the accompanying drawings in which FIG. 1 is a diagram showing the steps in processing reconsolidated wood products in accordance with the invention described in the aforementioned Australian patent specification No. 510,845;

Figure 1:
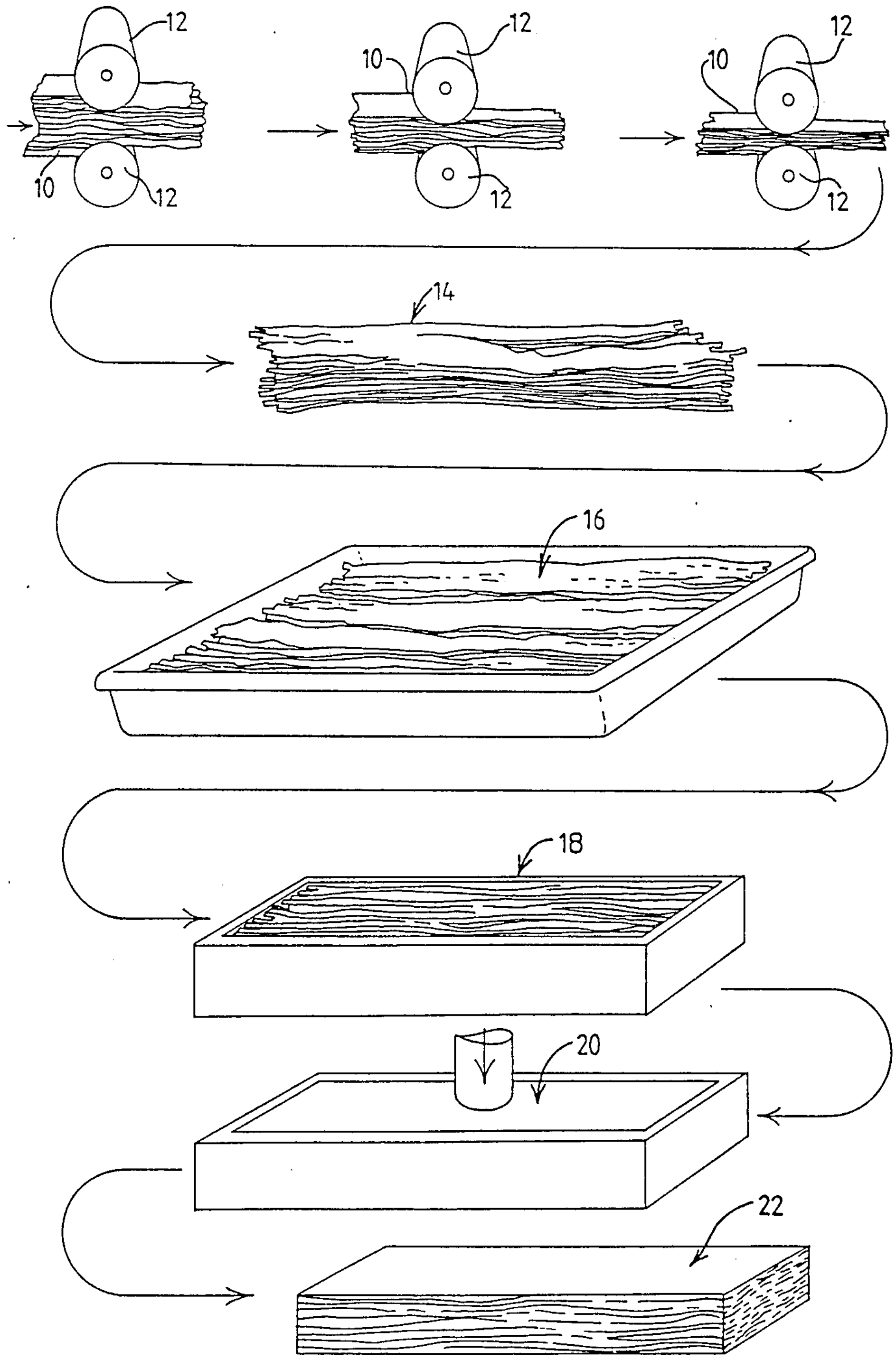

Referring firstly to FIG. 1, in the process of Australian Patent Specification No. 510,845 natural wood logs 10 are first partially broken down, being passed successively between rollers 12 of one or more roller pairs to induce cracking and thence progressively open up the log structure to form it into a web of loosely interconnected splinter-like strands (called "splinters" in Patent Specification No. 510,845). The resultant web, shown at 14 in FIG. 1 is of flexible open lattice work form, individual strands maintaining the original grain direction of the wood. Adhesive is then applied to the webs 14 such as by immersion in a suitable liquid adhesive in a bath 16 as shown. After removal of excessive adhesive, a plurality of webs 14 are assembled together, such as by laying them one over the other in a suitable mould 18. The assemblage of overlaid webs 14 is then compressed in mould 18 such as by compression between the base of the mould and an upper press element 20 as shown, and the adhesive is cured, to form the final product 22.

Product 22 is characterized in that it comprises a plurality of wood stands which remain naturally interconnected and which extend generally in the original grain direction of the wood. The strands are bound together by the adhesive but are positioned in somewhat displaced relative locations as compared with the positions occupied in the original log 10. The product 22 has been found to be particularly satisfactory as it possesses good mechanical properties, due to the relatively small degradation of the original wood structure which is caused by the process, as well as good nailability and a generally pleasing appearance.

Figure 2:
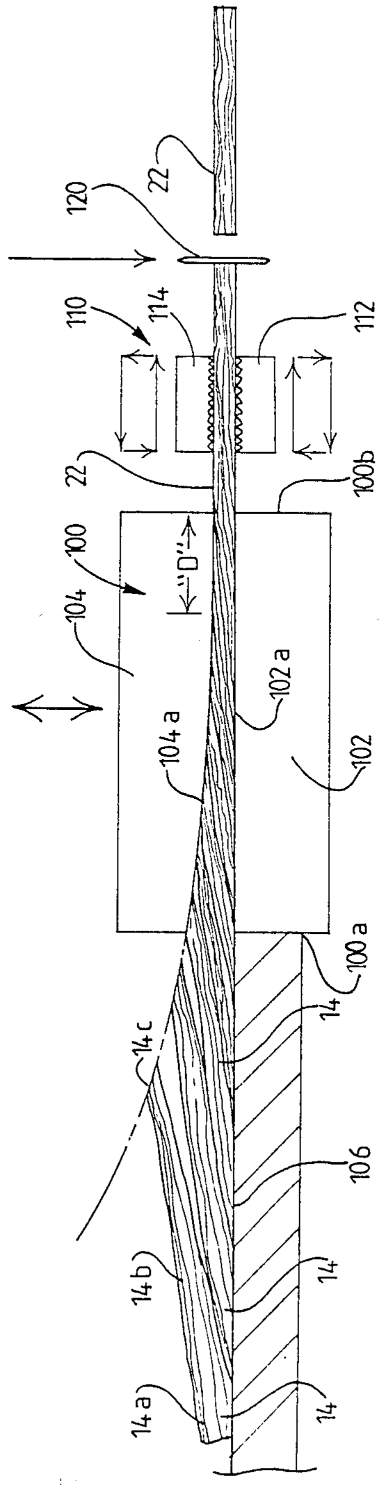
FIG. 2 is a schematic diagram of apparatus used in practising the method of the present invention.

The process immediately before described is a batch-type process and FIG. 2 shows a method of processing webs 14 by a semi-continuous process in accordance with this invention.

In FIG. 2, webs 14, preformed as immediately above described and precoated with bonding agent, such as by use of the apparatus described later, are passed to a compression device 100. This comprises two compression members 102, 104 positioned one above the other. In this instance, member 102 has a flat upper surface 102*a* and member 104 has an, opposed, under surface 104*a* which is non linear so that the space between the members 102 and 104, as defined by the opposed surfaces 102*a*, 104*a*, tapers from a relatively wide opening at an input end 100*a* of the device 100 to a relatively narrow output end 100*b*. At locations towards the output end, the surfaces 104*a*, 104*b* may however, as shown, be substantially parallel. The member 102 is mounted rigidly, but the member 104 is mounted, such as by hydraulic rams, in such a fashion as to be movable vertically so as to vary the space between the surfaces 102*a*, 104*a* from a minimum magnitude, as shown in the drawing, to a maximum magnitude (not illustrated). The webs 14 are laid in, as shown, in overlapping configuration on a feed table having an upper surface 106, as shown, leading to the input end of the apparatus. The webs are laid in overlapping fashion so that a rear end 14*a* of each web rests on the surface 106, and an intermediate portion 14*b* overlies the immediately preceding web 14 with the forward end 14*c* of each web being positioned over the underlying web 14 at a location somewhat back from the forward end of that immediately preceding web.

The arrangement of the device 100 is such that a certain length of pre-laid-up webs on table surface 106 is advanced into the space between the members 102, 104, when member 104 is at its uppermost position. Then the member 104 is moved downwardly to effect compression of the webs 14 therebetween and also to effect curing of the bonding agent of the webs 14 therein, at least over a substantial part of the length of the device 100 extending back from the output end 100*b* thereof. Then, the member 104 is again moved upwardly and a completed section of final product 22 is withdrawn and emerges from the apparatus.

The movement of the webs 14 through the device 100 is effected by use of an engagement device 100. This comprises two opposed gripping elements 112, 114 disposed to opposite sides of the emergent product 22. To effect movement, the gripping elements are moved towards each other to engage the product 22 from either side thereof, and thence the two elements are moved together away from the output end 100*b* of the device 100 to draw a length of product 22 from the device 100. This movement is effected at a time when the member 104 is in its upper position. Then, the two elements 112, 114 are moved away from each other and out of engagement with the product 22 and thence back towards the apparatus 100 ready for a subsequent engagement and movement step. Completed sections of product 22 may e docked off by use of a saw 120 movable to traverse the product 22 at times when the emergent product 22 is not being moved.

The members 102 and/or 104 may be heated to effect curing of the bonding agent on the webs 14 as these pass through the device 100. In any event, the arrangement is such that sufficient bonding occurs over the length of the material represented by webs 14 within the length of device 100 that, when the finished product 22 is moved by action of the engagement means 110, in-feeding to the device 100 occurs in such a fashion as to draw into the device 100 sufficient of the webs 14 at the input end to form a length of product 22 equal to the length so advanced from the output end.

Figure 3:
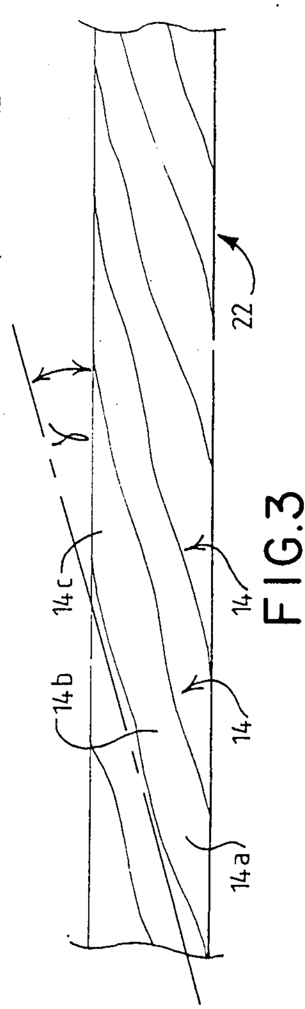
FIG. 3 is a fragmentary side view of a reconsolidated wood product formed by the apparatus in FIG. 2.

The above process is capable of being operated in a semi-continuous fashion as described to produce product 22 of the form shown in more detail in FIG. 3.

It will be appreciated that webs 14 when formed by the process of Australian Patent Specification No. 510,845 will process a greater cross-sectional area at one end as compared to the other end, by virtue of the natural taper of trees. That is to say that part of the web formed from the part of a log closest the base of the tree from which the log was cut will be of greater cross-sectional area than the other end thereof. In the arrangement shown in FIG. 2, the webs 14 are laid with the greater cross-sectional area portion lowermost. During the compression and consolidation process, the upper ends 14*c* of the webs are compressed relatively downwardly so that each web assumes a slightly curved configuration as shown in FIG. 3. The webs 14 each extend at an angle to the lengthwise direction of extent of the product 22. This angle, designated "$\gamma$" in FIG. 3, may be of the order of 0°–5°. The angle "$\frac{1}{2}$" is determined by the ratio between the length of the webs 14 and the thickness of the product 22. It has been found satisfactory for many applications to arrange the webs so that at any cross-section of the finished product 22 six webs appear. It is a consequence of the described angular lay-out of webs 14 that each web has its lower end 14*a* at one (lower) surface of the finished product 22, and its upper end 14*c* at the opposed (upper) surface of the product 22.

While the above process involves laying down of individual webs 14, in practice it is possible to bundle a number of webs together and to lay down the bundles one after the other rather than individual webs as described. With such an arrangement, it is preferred to weigh each bundle before laying down so as to maintain each bundle of webs approximately the same weight thereby to facilitate obtaining a product 22 of relatively uniform density.

Although the operation of the apparatus of FIG. 2 has been described in relation to a semi-continuous process it would of course be possible to adapt the process for continuous operation. For example the members 100, 104 may be fixed and, by appropriately arranging for a sufficient degree of curing of the bonding material to occur back from the output end of the device 100, during operation, the product 22 may be drawn from the device 100 in a continuous process. Whether the process is operated intermittently, it is advisable to ensure that advancement of the material through the device 100, at each incremental advance is for a distance which is not greater than the distance in "D" shown in FIG. 2, being a distance for which the surfaces 102*a*, 104*a* extend in parallel relationship back from the output end 100*b* of the apparatus.

Figure 4:
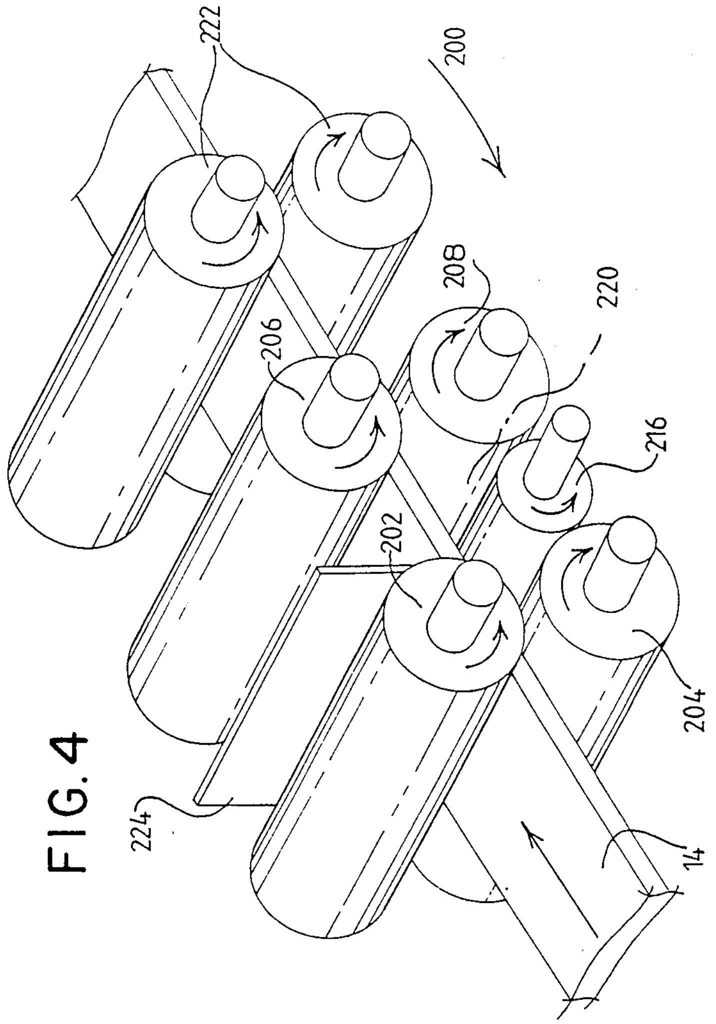
FIG. 4 is a perspective view of a device useful for coating bonding agent onto webs prior to passage to the apparatus of FIG. 2.
Figure 5:
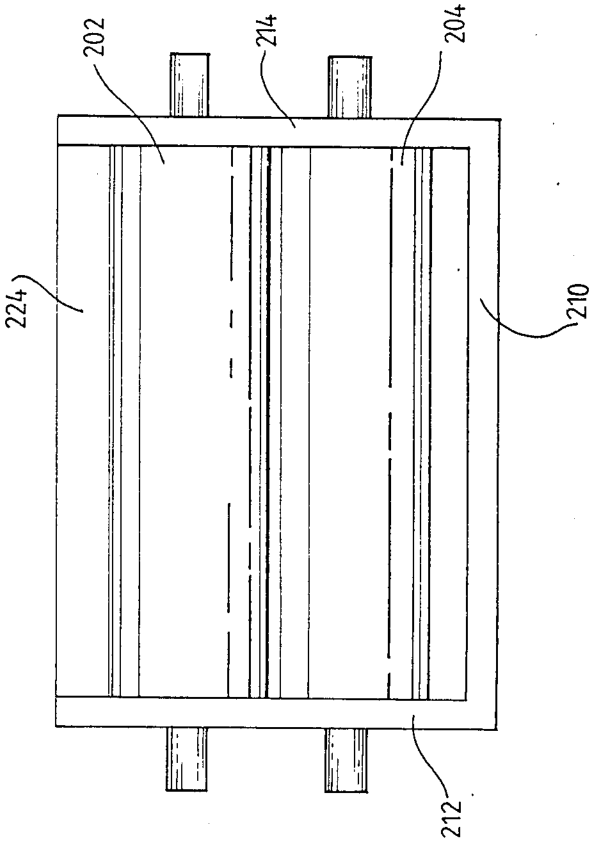
FIG. 5 is a front view of the apparatus of FIG. 4.

When operating the process as described above whether continuously or intermittently, it is preferred that the coating of the webs 14 with bonding agent be effected on a semi-continuous or continuous basis. FIGS. 4 and 5 show an apparatus 200 suitable for this purpose. Apparatus 200 includes a pair of input rollers 202, 204 and a pair of output rollers 206, 208. Rollers 202, 204 are mounted on a frame 210 (FIG. 5 only). The rollers are rubber surfaced and have rubber transverse end surfaces at each end. The rollers are arranged with roller 202 above 204 and with the surfaces of the rollers in engaging contact. The transverse end surfaces of the rollers engage inner surfaces of upright side walls 212, 214 of frame 210. The output rollers 206, 208 likewise have rubber surfaces and rubber transverse end surfaces. These are arranged one above the other with roller 206 above and in contact with roller 208. The transverse end surfaces of the rollers 206, 208 are likewise engaged with upright side surfaces of the walls 212, 214 of frame 210. An idler roller 216 is positioned between and in driving contact with rollers 204, 208. It is formed with end surfaces which engage the inner upright surfaces of the walls 212, 214 of frame 210. In the rest state, the rollers 202, 204, by virtue of their engagement together, form an upright wall at the input end of the apparatus and rollers 206, 208 likewise form and upright wall at the output end. A base wall is defined by the three rollers 204, 216, 208, by virtue of the contact between these rollers. When viewed from the side, then, the apparatus 200 defines a cavity 220 closed at the front by the rollers 202, 204, at the rear by rollers 206, 208 and at the bottom by rollers 204, 216, 208. Cavity 220 is closed at opposed sides of the apparatus by the side walls 212, 214, which sealingly engage the transverse end surfaces of the rollers 202, 204, 216, 206, 208. The rubber surfaces of the rollers 202, 204, 206, 208 are made of sufficient resilience to permit a web 14 or bundle of webs 14 to be passed between the pairs of roller 202, 204 and 206, 208, the rubber surfaces enclosing and bearing against the periphery of the cross-section of the web during this action.

To use the apparatus 200, the cavity 220 is filled with bonding agent, such as a bonding agent formed of a solution of tannin together with a suitable activator which has been foamed by mechanical mixing. Then, the webs are passed through the apparatus 200, first passing through the rollers 202, 204 and thence emerging through the rollers 206, 208. This action may be facilitated by driving the rollers 202, 204, 206 and 208 (by means not shown) in the directions indicated by arrows on the rollers in FIG. 4. Thus, a web 14 may be driven through the apparatus 200 to emerge from the roller pair 206, 208 coated with the bonding agent in the cavity 220. The close engagement between the rollers 202, 204; 206, 208 prevents substantial loss of bonding agent from the cavity 220. Excess material may be removed by a pair of squeeze rollers 222 through which the webs 14 pass after leaving the apparatus 200.

In order to prevent escape of picked-up bonding agent on the roller 202 during rotation thereof, a plate 224 is provided which engages the periphery of the roller 202. After coating as above described in the apparatus 220, and removal of excess bonding agent by action of the roller pair 222, webs 14 are passed to the device 100 as previously described.

Figure 6:
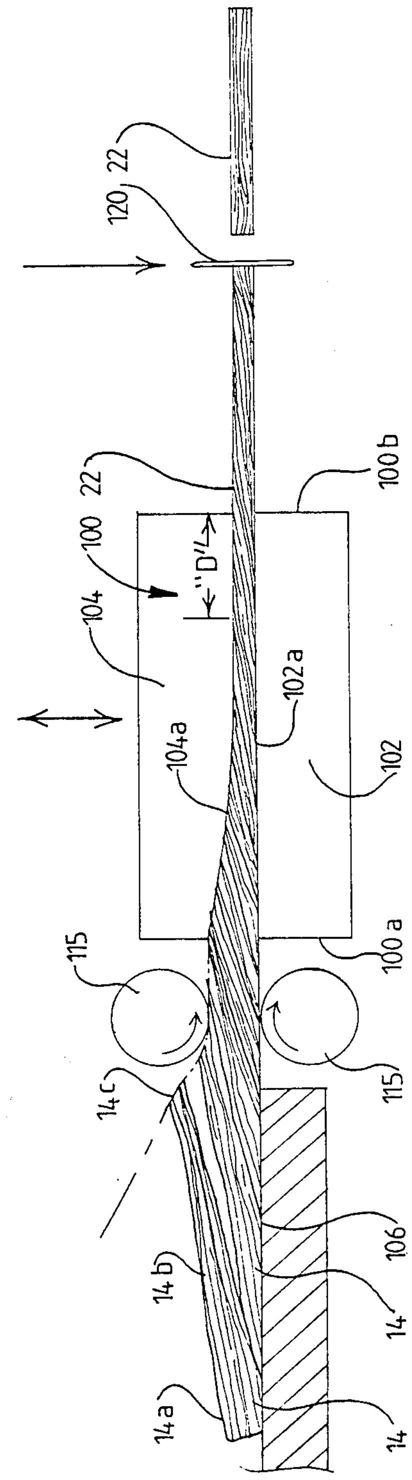
FIG. 6 shows a modified form of apparatus useful in practising the present invention.

While the apparatus of FIG. 2 operates to pull webs 14 through the compression device 100, FIG. 6 shows a modified arrangement in which the webs 14 are fed to device 100 by pushing at the input end. In this figure parts commonly shown in FIGS. 2 and 6 are shown by like reference numerals and only the differences as between the two figures are now described. In particular, the engagement device 110 is omitted and replaced by a pair of rollers 115 arranged at the input end 100*a* of the device 100. At least one of these rollers 115 is driven intermittently to move webs 14 presented thereto into the device 100 when members 102, 104 are moved apart. The product 22 emerging from the device 100 is thus pushed through the device 100. Of course, rollers like rollers 115 could be employed at the output end of the device 100 to engage the emergent product 22 to move webs 14 through the device 100. Likewise engagement device 110 could be positioned at the input end of the device 100 to engage and move webs 14 into the device 100.

The described method and apparatus have been advanced merely by way of explanation and many modifications may be made thereto without departing from the spirit and scope of the invention as defined in the appended claims.

I claim:

1. A process for forming an extended elongate reconsolidated wood product from a plurality of flexible open lattice work webs each of naturally interconnected wood strands, each said web being formed by partially rending natural wood so that said strands thereof are generally aligned along a common grain direction, a substantial proportion of said strands of each web being substantially discrete but incompletely separated from each other, said process comprising superposing said webs in such a fashion that the webs make an acute angle to the longitudinal direction of extent of the product and so that adjacent webs partly overlap each other in said direction and applying a bonding agent to the webs, compressing the superposed webs to consolidate the strands while maintaining them such as to substantially extend in said original grain direction and curing the bonding agent to hold the strands of said superposed webs together in juxtapositions assumed pursuant to said consolidation, said compressing step comprising passing the superposed webs longitudinally through a compression device from an inlet end to an outlet end, the compression device comprising two compression elements relatively movable towards each other from an open condition to effect said compression and consolidation, said passing step comprising relatively displacing the superposed webs through the compression device from the inlet end a distance less than one half the length of the compression device between the inlet and outlet ends when the compression elements are in their open condition and wherein the compression elements are moved towards each other to effect said compression and consolidation when the superposed webs are stationary in the longitudinal direction and said curing is effected when the superposed webs are compressed by the compression elements in portions of the superposed webs in the compression device adjacent the outlet end thereof, and said passing step, said compression and consolidation and said curing are repeated along the entire length of the superposed webs to produce said extended product.

2. A process as claimed in claim 1 wherein said passing step is effected by engagement and movement of the reconsolidated wood product emerging from the compression device.

3. A process as claimed in claim 2 wherein the engagement and movement of the reconsolidated product emerging from the compression device is effected by gripping the product with gripping means and moving the gripping means longitudinally of the product.

4. A process as claimed in claim 1 wherein said passing step is effected by engaging and moving said superposed webs ahead of the inlet end of the compression device.

5. A process as claimed in claim 1 wherein the compression applied to the superposed webs increases in the direction from the inlet end to the outlet end of the compression device.

6. A process according to claim 5 wherein the increase in compression applied to the superposed webs is effected by providing a reduced separation of the compression elements from the inlet end to the outlet end during the compression, and wherein the separation of the compression elements along the portion thereof adjacent the outlet end at which curing of the bonding agent occurs is constant during the compression.

7. A process according to claim 6 wherein the superposed webs are displaced in said passing step by a distance corresponding to the length of the compression device measured from the outlet end along which the separation of the compression elements is constant during the compression.

* * * * *